(12) United States Patent
Tariq

(10) Patent No.: US 8,027,350 B1
(45) Date of Patent: Sep. 27, 2011

(54) REMOVAL OF A PACKET COMMUNICATION SYSTEM FROM A COMMUNICATION PATH DURING A COMMUNICATION SESSION

(75) Inventor: Mohammad Tariq, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 868 days.

(21) Appl. No.: 11/748,307

(22) Filed: May 14, 2007

(51) Int. Cl.
*H04L 12/28* (2006.01)
*H04L 12/56* (2006.01)
*H04L 12/16* (2006.01)
*H04Q 11/00* (2006.01)

(52) U.S. Cl. ........ 370/401; 370/400; 370/402; 370/260; 370/270

(58) Field of Classification Search .......... 370/260–270, 370/400–402
See application file for complete search history.

(56) References Cited

U.S. PATENT DOCUMENTS

| | | | |
|---|---|---|---|
| 6,282,192 B1 * | 8/2001 | Murphy et al. | 370/352 |
| 6,393,289 B1 | 5/2002 | Bunting et al. | |
| 6,868,080 B1 * | 3/2005 | Umansky et al. | 370/354 |
| 7,633,929 B1 * | 12/2009 | Fu et al. | 370/352 |
| 2002/0131427 A1 * | 9/2002 | Niermann | 370/401 |
| 2002/0159439 A1 * | 10/2002 | Marsh et al. | 370/352 |
| 2004/0184446 A1 * | 9/2004 | Havens | 370/352 |
| 2008/0037533 A1 * | 2/2008 | Wah et al. | 370/389 |

* cited by examiner

*Primary Examiner* — Hassan Phillips
*Assistant Examiner* — Lonnie Sweet

(57) ABSTRACT

A communication system establishes a communication path between users through separate TDM nodes and a packet system. The communication system removes the packet system from the communication path during the communication session. To accomplish the removal, the communication system connects the separate TDM nodes within the TDM system and removes the portion of the communication path that traverses the packet system. If the packet system connects a service node to the communications path, then the communication system effectively removes the service node from the communications path during the session.

20 Claims, 7 Drawing Sheets

REMOVAL OF A PACKET COMMUNICATION SYSTEM FROM A COMMUNICATION PATH DURING A COMMUNICATION SESSION

BACKGROUND OF THE INVENTION

1. Field of the Invention

The invention is related to the field of communications, and in particular, to the controlled removal of a packet communication system from a communication path during a communication session.

2. Description of the Prior Art

Time Division Multiplex (TDM) systems have been used for many years to establish communication paths between users. More recently, packet communication systems have also been used to establish communication paths between users. In many cases, the users are connected to separate TDM systems, and the separate TDM systems are connected by a packet communication system. Thus, the communication path between two users extends from the first user through a first TDM system to the packet system, and from the packet system through a second TDM system to the second user.

Communication service platforms provide various services to the users, such as operator assistance and voice recognition. To provide the service, a communication path is established from the user to the service platform. In many cases, the service platform then extends the communication path to another user. For example, a first user initiates a communication path to an operator assistance platform, and after providing operator assistance, the platform extends the communication path to a second user.

In many scenarios, the service platform is used to establish the communication path between users, but the platform is no longer used after the communication path has been established. For example, the operator assistance platform is used to establish the communication path between users, but the platform is typically not used after this communication path has been established.

To free-up the service platform for other users, the portion of the communication path that passes through the service platform is released during the communication session. In TDM systems, a single TDM node extends the communication path from the first user to the service platform, and the same TDM node also extends the communication path from the service platform to the second user. When the service platform is finished providing the service, the platform signals the single TDM node, and the single TDM node eliminates the portion of the communication path to and from the service platform.

Unfortunately, the above technique for removing the service node from the communication path is ineffective where a packet network connects separate TDM systems, because the communication path to and from the service node does not pass through the same TDM node. For example, the communication path from a first user extends through a first TDM node and a packet system to a service platform. The communication path then extends from the service platform through the packet system and a second TDM node to a second user. Since the communication path does not pass through the same TDM node both to and from the service platform, neither the first TDM node nor the second TDM node can effectively remove the service platform from the communication path.

SUMMARY OF THE INVENTION

In a communication system that establishes a communication path between users through separate TDM nodes and a packet system, the communication system removes the packet system from the communication path during the communication session. To accomplish the removal, the communication system connects the separate TDM nodes within the TDM system and removes the portion of the communication path that traverses the packet system. If the packet system connects a service node to the communications path, then the communication system effectively removes the service node from the communications path during the session.

In some examples, the user initiates the removal of the packet system from the communication path during the communication session. The user also initiates the addition of the packet system back to the communication path during the session. If the packet system connects a service node to the communication path, the user can effectively remove the service node from the communication path and add the service node back to the communication path during the communication session.

DETAILED DESCRIPTION OF THE PREFERRED EMBODIMENT

Figure 1:
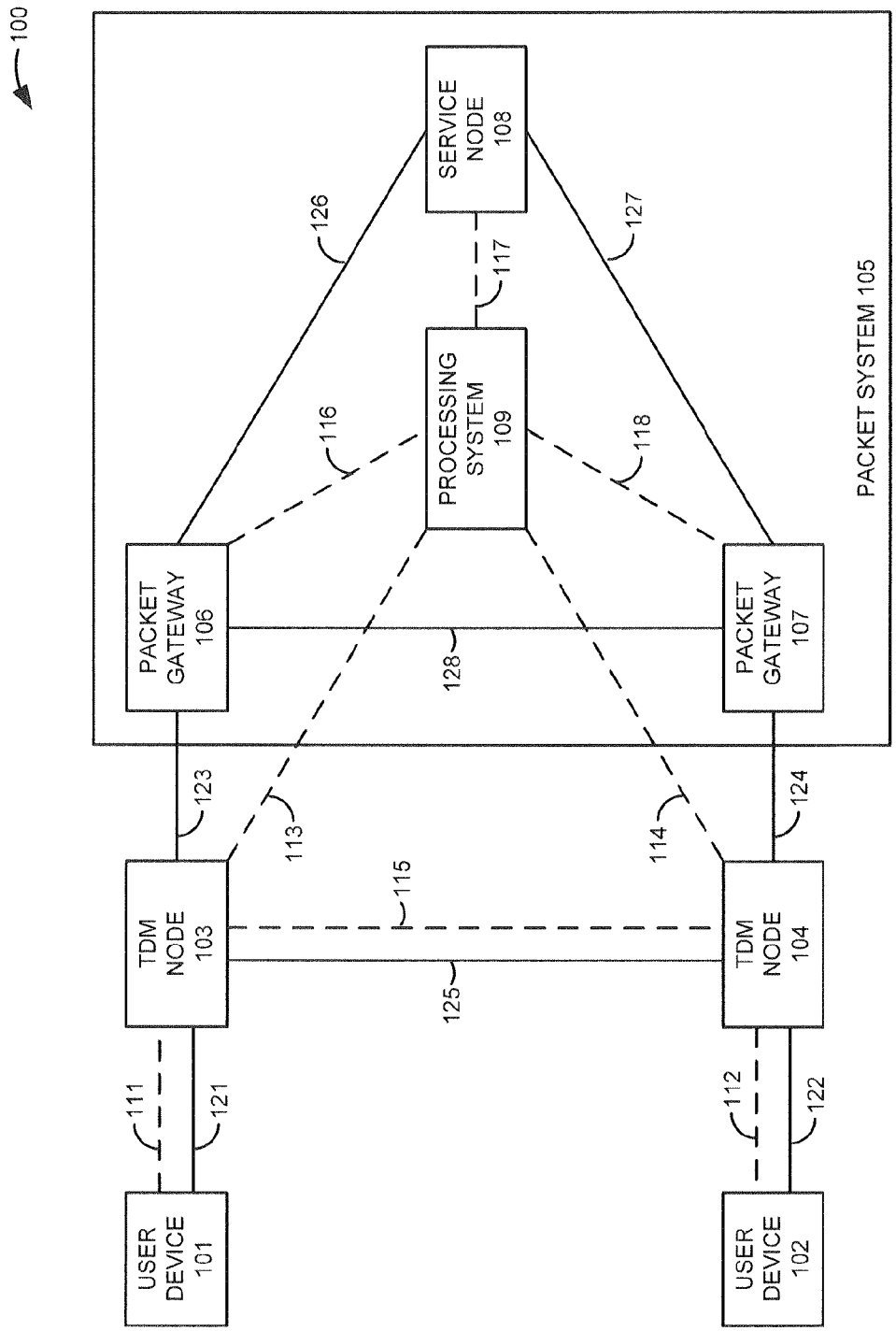
FIG. 1 illustrates a communication system in an embodiment of the invention.

FIG. 1 illustrates communication system 100 in an embodiment of the invention. Communication system 100 comprises TDM nodes 103-104 and packet system 105. Packet system 105 includes packet gateways 106-107, service node 108, and processing system 109. Communication system 100 exchanges signaling over links 111-118. Communication system 100 exchanges user communications over connections 121-128. Links 111-118 and connections 121-128 may include various intermediate systems that are omitted for clarity.

Processing system 109 is coupled to TDM node 103 by link 113 and to TDM node 104 by link 114. TDM nodes 103-104 are coupled by link 115. Links 113-115 transfer Signaling System #7 (SS7) signaling, Interim Standard 41 (IS-41) signaling, or some other form of TDM network signaling adapted in accord with this disclosure. Processing system 109 is coupled to packet gateway 106 by link 116, to service node 108 by link 117, and to packet gateway 107 by link 118. Links 116-118 transfer Session Initiation Protocol (SIP) signaling, Media Gateway Control Protocol (MGCP) signaling, or some other form of packet network signaling adapted in accord with this disclosure.

TDM node 103 is coupled to packet gateway 106 by connection 123. TDM node 104 is coupled to packet gateway 107 by connection 124. TDM node 103 is coupled to TDM node 104 by connection 125. Connections 123-125 use the TDM format. Packet gateway 106 is coupled to service node 108 by connection 126. Packet gateway 107 is coupled to service node 108 by connection 127. Packet gateway 106 is coupled to packet gateway 107 by connection 128. Connections 126-128 use Internet Protocol (IP), Asynchronous Transfer Mode (ATM), Ethernet, or some other packet communication format.

User device 101 and TDM node 103 are coupled by link 111 and connection 121. User device 102 and TDM node 104 are coupled by link 112 and connection 122. Links 111-112 and connections 121-122 may use various protocols and may include various intermediate systems. For example, link 111 and connection 121 may include a wireless base station, and link 112 and connection 122 may include a local telephone network. User devices 101-102 do not necessarily use the TDM format or TDM network signaling.

User devices 101-102 comprise telephones, computers, personal digital assistants, Internet appliances, wireless transceivers, or some other user communication device that is adapted in accord with this disclosure. TDM nodes 103-104 comprise TDM switches, Mobile Switching Centers (MSCs), wireless transceivers, or some other communication equipment that is adapted in accord with this disclosure. Packet gateways 106-107 comprise Voice over Internet Protocol (VOIP) gateways, border controllers, or some other communication device that is adapted in accord with this disclosure. Service node 108 comprises a computer platform that is adapted to exchange user communications to provide a service in accord with this disclosure. The service could include virtual private network, voice recognition, conferencing, operator assistance, voice mail, PIN-based access, location service, or some other communication-based service. Processing system 109 comprises a VOIP soft-switch, media gateway controller, or some other type of communication signaling processor that is adapted in accord with this disclosure. Processing system 109 may be distributed across multiple signaling processors at different locations.

Figure 2:
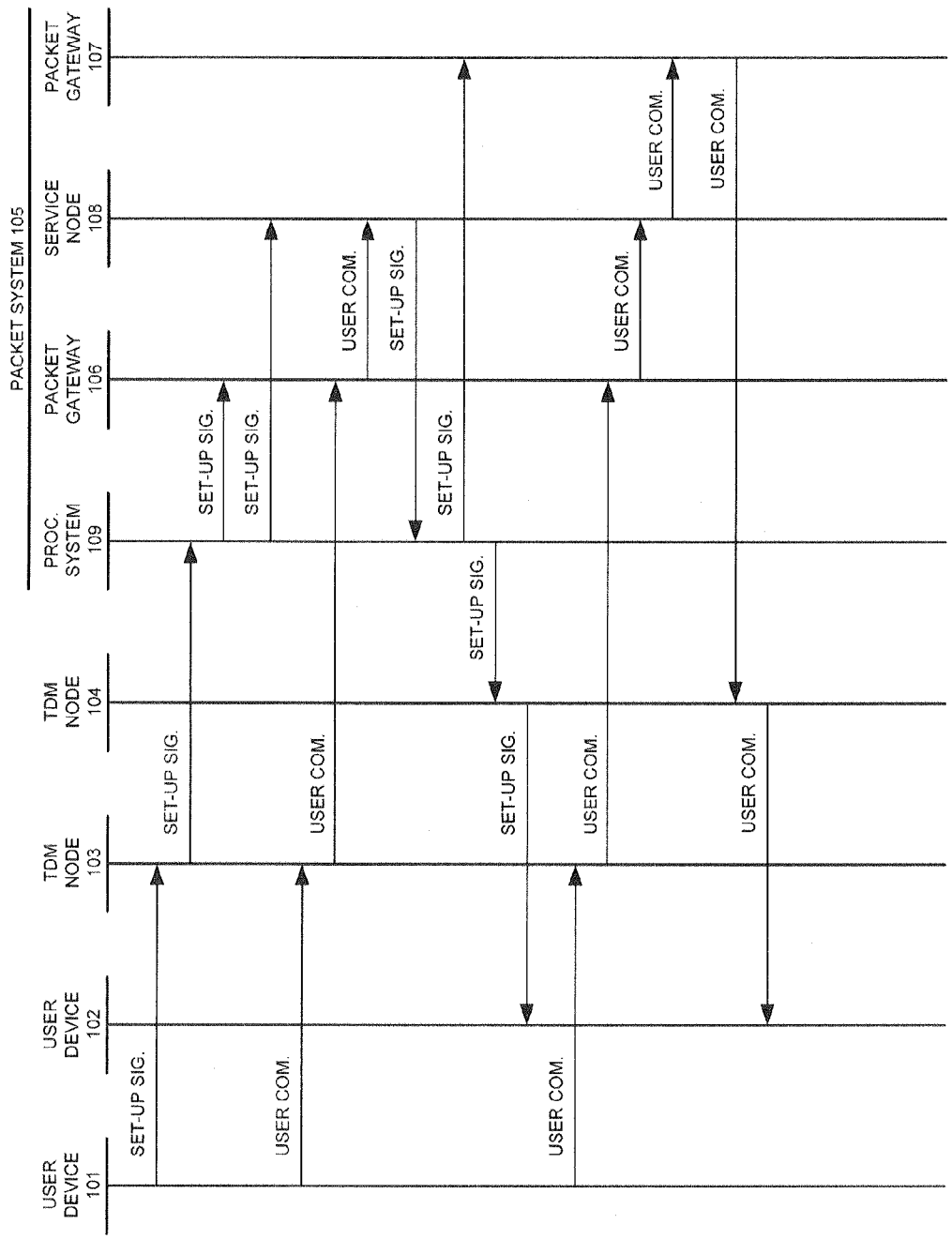
FIG. 2 illustrates the operation of the communication system in an embodiment of the invention to establish a communication path between user systems through TDM nodes and a packet system.

FIG. 2 illustrates the operation of communication system 100 in an embodiment of the invention to establish a communications path between user systems 101-102 through TDM nodes 103-104 and packet system 105. User device 101 transfers set-up signaling to TDM node 103 to initiate the communication session. TDM node 103 processes the set-up signaling to select TDM connection 123 to packet gateway 106. TDM node 103 transfers set-up signaling to processing system 109 indicating TDM connection 123. Processing system 109 processes the set-up signaling to select packet connection 126. Processing system 109 transfers set-up signaling to packet gateway 106 indicating TDM connection 123 and packet connection 126. Processing system 109 transfers set-up signaling to service node 108 indicating packet connection 126.

TDM node 102 receives user communications from user device 101 over connection 121. TDM node 102 transfers the user communications to packet gateway 106 over TDM connection 123. Packet gateway 106 transfers the user communications to service node 108 over packet connection 126. Service node 108 processes the user communications to provide a service to user device 101. For example, service node 108 might provide operator assistance to determine that user device 101 needs to communicate with user device 102. Service node 108 transfers set-up signaling to processing system 109 in response to providing the service.

Processing system 109 processes the set-up signaling from service node 108 to select packet connection 127 and TDM connection 124. Processing system 109 transfers set-up signaling to service node 108 indicating packet connection 127. Processing system 109 transfers set-up signaling to packet gateway 107 indicating packet connection 127 and TDM connection 124. Processing system 109 transfers set-up signaling to TDM node 104 indicating the TDM connection 124. TDM node 104 processes the set-up signaling from processing system 109 to select connection 122. TDM node 104 transfers set-up signaling to user device 102.

TDM node 102 receives user communications from user device 101 over connection 121 and transfers the user communications to packet gateway 106 over TDM connection 123. Packet gateway 106 transfers the user communications to service node 108 over packet connection 126. Service node 108 transfers the user communications to packet gateway 107 over packet connection 127. Packet gateway 107 transfers the user communications to TDM node 104 over TDM connection 124. TDM node 104 transfers the user communications to user device 102 over connection 122. Thus, user communications for the communication session flow over a communication path from user device 101 to user device 102 through TDM nodes 103-104 and packet system 105.

Figure 3:
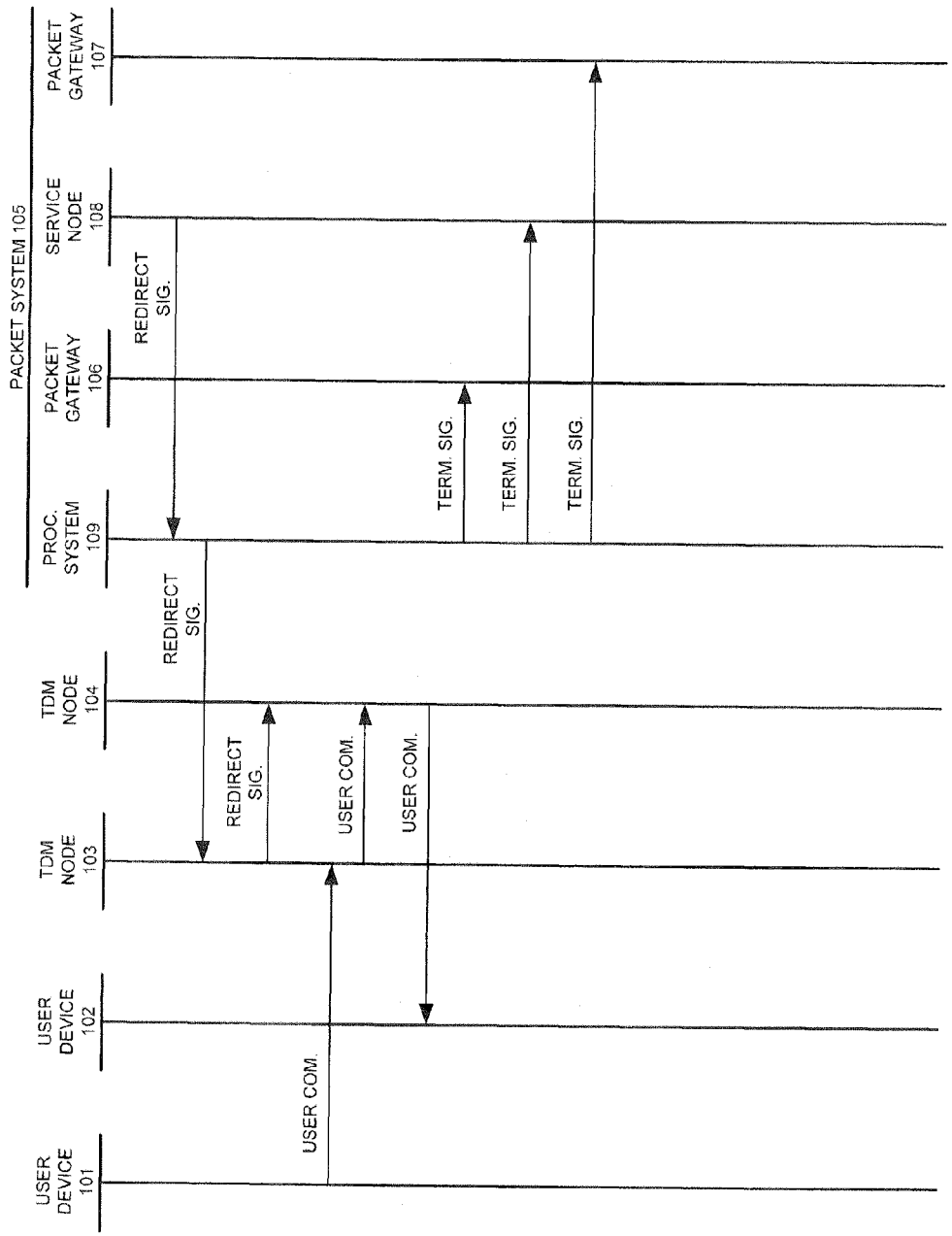
FIG. 3 illustrates the operation of the communication system in an embodiment of the invention to remove the packet system from the communication path during the communication session.

FIG. 3 illustrates the operation of communication system 100 in an embodiment of the invention to remove packet system 105 from the communication path during the communication session. The operation of FIG. 5 starts after the operations described above for FIG. 2. Thus, user communications for the session already flow over the communication path from user device 101 to user device 102 through TDM nodes 103-104 and packet system 105.

Service node 108 determines that packet system 105 should be removed from the user communication path for the session. For example, service node 108 may provide operator assistance, verify operational communications between user devices 101-102, and determine that packet system 105 is no longer required. In response to the determination, service node 108 transfers redirect signaling to processing system 109.

Processing system 109 processes the redirect signaling from service node 108 to transfer redirect signaling to TDM node 103. The redirect signaling to TDM node 103 indicates that TDM connections 123-124 should be removed from the communication path for the session and that TDM node 103 should redirect user communications for the session to TDM node 104. TDM node 103 processes the redirect signaling to select TDM connection 125 for the session. TDM node 103 transfers redirect signaling to TDM node 104 indicating that TDM connection 125 will be used for the session instead of TDM connection 124.

TDM node 103 receives user communications for the session from connection 121 and redirects the user communications to TDM node 104 over TDM connection 125. TDM node 104 receives the user communications for the session from TDM connection 125 and redirects the user communications to connection 122. Thus, packet system 105 has been removed from the user communication path during the session.

Processing system 109 transfers termination signaling to packet gateway 106 terminating the session over TDM connection 123 and packet connection 126. Processing system 109 transfers termination signaling to service node 108 terminating the session over packet connections 126-127. Processing system 109 transfers termination signaling to packet gateway 107 terminating the session over packet connection 127 and TDM connection 124.

Figure 4:
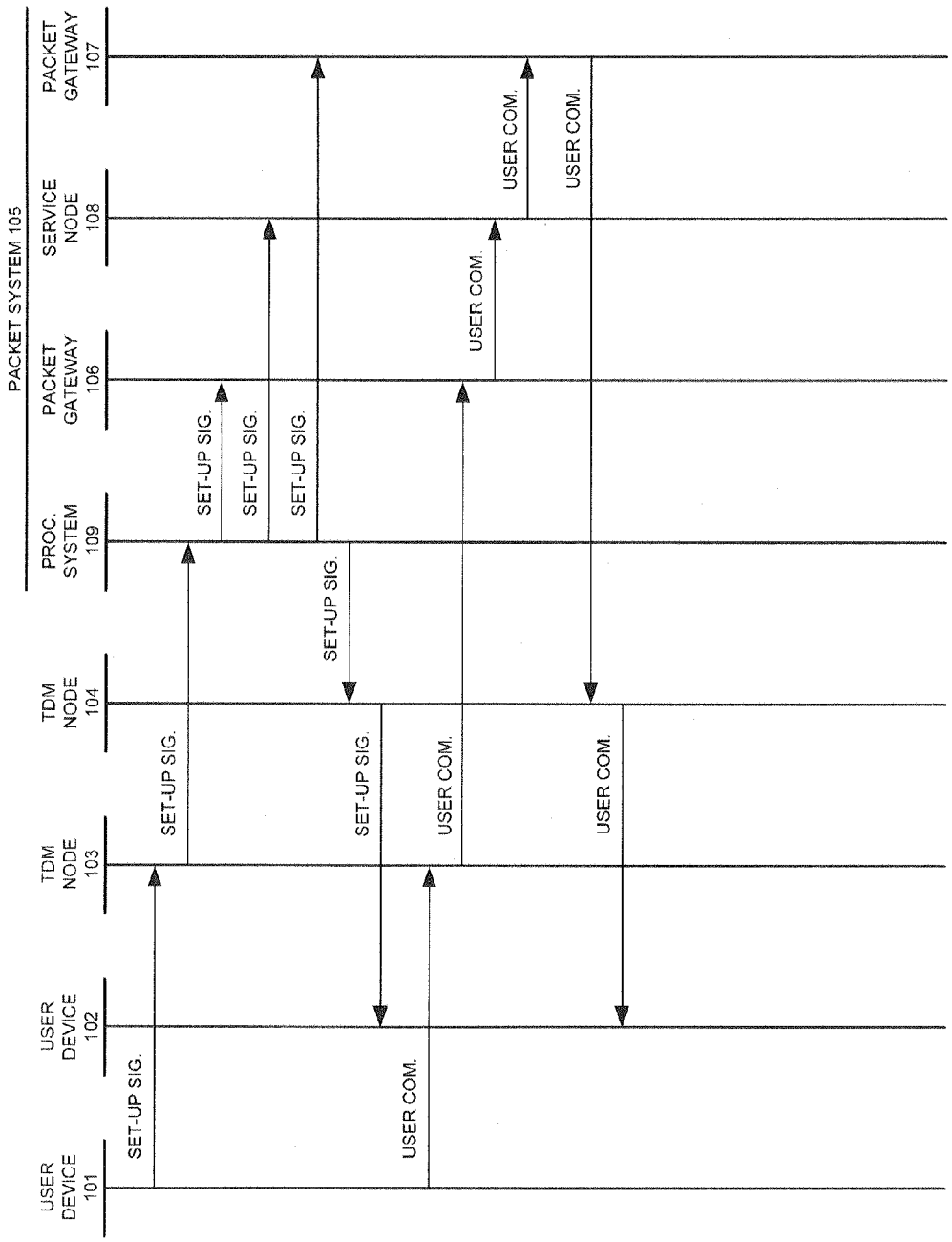
FIG. 4 illustrates the operation of the communication system in an embodiment of the invention to establish a communication path between user systems through TDM nodes and a packet system.

FIG. 4 illustrates the operation of communication system 100 in an embodiment of the invention to establish a communication path between user systems 101-102 through TDM nodes 103-104 and packet system 105. FIG. 4 shows an alternative technique to that described above for FIG. 2. In this alternative technique, processing system 109 completes the communication path through packet system 105 prior to service delivery by service node 108.

User device 101 transfers set-up signaling to TDM node 103 to initiate the communication session. TDM node 103 processes the set-up signaling to select TDM connection 123 to packet gateway 106. TDM node 103 transfers set-up signaling to processing system 109 indicating TDM connection 123.

Processing system 109 processes the set-up signaling to select packet connections 126-127 and TDM connection 124. Processing system 109 transfers set-up signaling to packet gateway 106 indicating TDM connection 123 and packet connection 126. Processing system 109 transfers set-up signaling to service node 108 indicating packet connections 126-127. Processing system 109 transfers set-up signaling to packet gateway 107 indicating packet connection 127 and TDM connection 124. Processing system 109 transfers set-up signaling to TDM node 104 indicating TDM connection 124. TDM node 104 processes the set-up signaling from processing system 109 to select connection 122. TDM node 104 transfers set-up signaling to user device 102.

TDM node 102 receives user communications from user device 101 over connection 121 and transfers the user communications to packet gateway 106 over TDM connection 123. Packet gateway 106 transfers the user communications to service node 108 over packet connection 126. Service node 108 provides a service to the user communications and transfers the user communications to packet gateway 107 over packet connection 127. Packet gateway 107 transfers the user communications to TDM node 104 over TDM connection 124. TDM node 104 transfers the user communications to user device 102 over connection 122. Thus, user communications for the session flow over the communication path from user device 101 to user device 102 through TDM nodes 103-104 and packet system 105.

Figure 5:
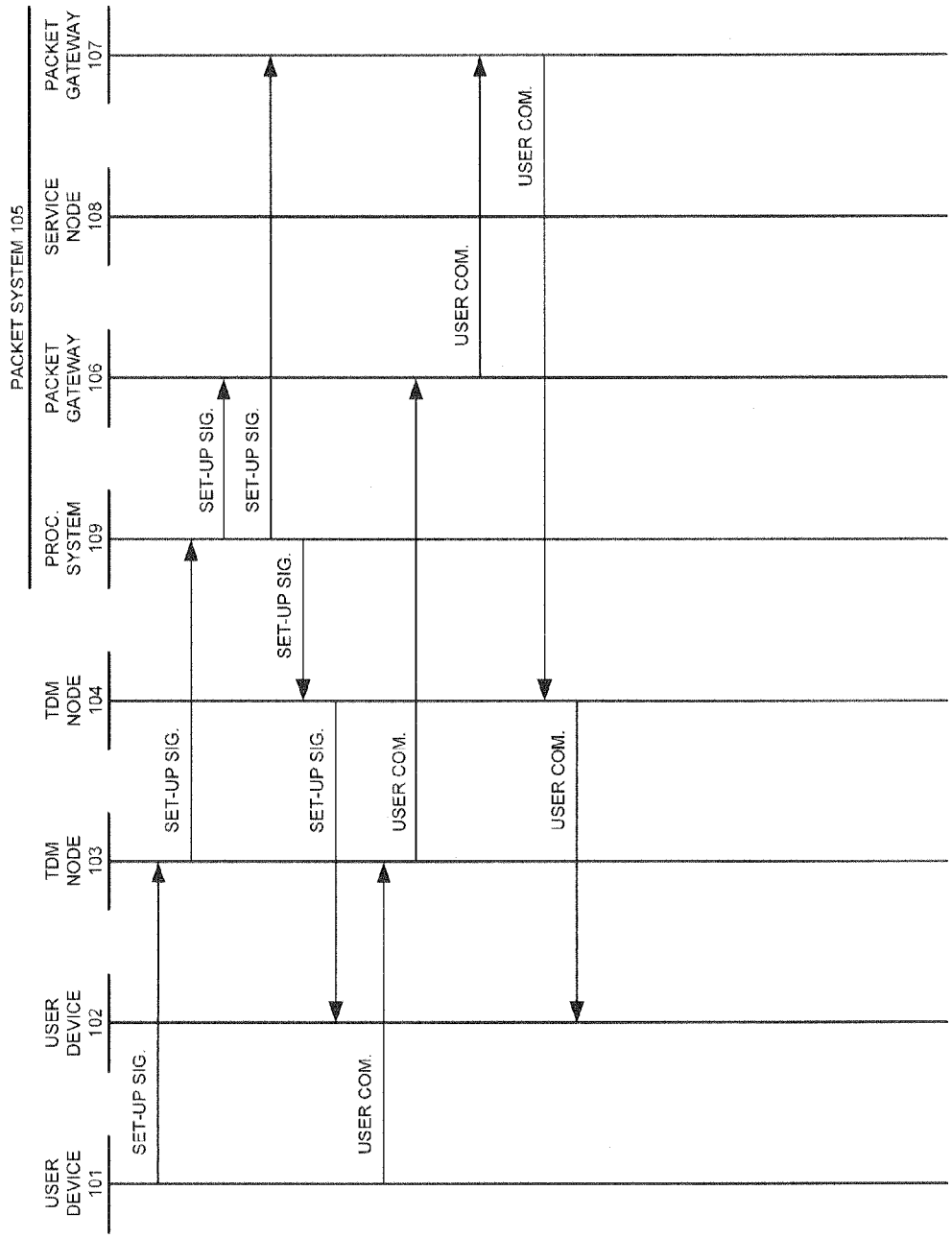
FIG. 5 illustrates the operation of the communication system in an embodiment of the invention to establish a communication path between user systems through TDM nodes and a packet system.

FIG. 5 illustrates the operation of communication system 100 in an embodiment of the invention to establish a communication path between user systems 101-102 through TDM nodes 103-104 and packet system 105. FIG. 4 shows an alternative technique to those described above for FIGS. 2 and 4. In this alternative technique, service node 108 in packet system 105 is not used for the communication session.

User device 101 transfers set-up signaling to TDM node 103 to initiate the communication session. TDM node 103 processes the set-up signaling to select TDM connection 123 to packet gateway 106. TDM node 103 transfers set-up signaling to processing system 109 indicating TDM connection 123.

Processing system 109 processes the set-up signaling to select packet connection 128 and TDM connection 124. Processing system 109 transfers set-up signaling to packet gateway 106 indicating TDM connection 123 and packet connection 128. Processing system 109 transfers set-up signaling to packet gateway 107 indicating packet connection 128 and TDM connection 124. Processing system 109 transfers set-up signaling to TDM node 104 indicating the TDM connection 124. TDM node 104 processes the set-up signaling from processing system 109 to select connection 122. TDM node 104 transfers set-up signaling to user device 102.

TDM node 102 receives user communications from user device 101 over connection 121 and transfers the user communications to packet gateway 106 over TDM connection 123. Packet gateway 106 transfers the user communications to packet gateway 107 over packet connection 128. Packet gateway 107 transfers the user communications to TDM node 104 over TDM connection 124. TDM node 104 transfers the user communications to user device 102 over connection 122. Thus, user communications for the session flow from user device 101 to user device 102 over the communication path through TDM nodes 103-104 and packet system 105.

Figure 6:
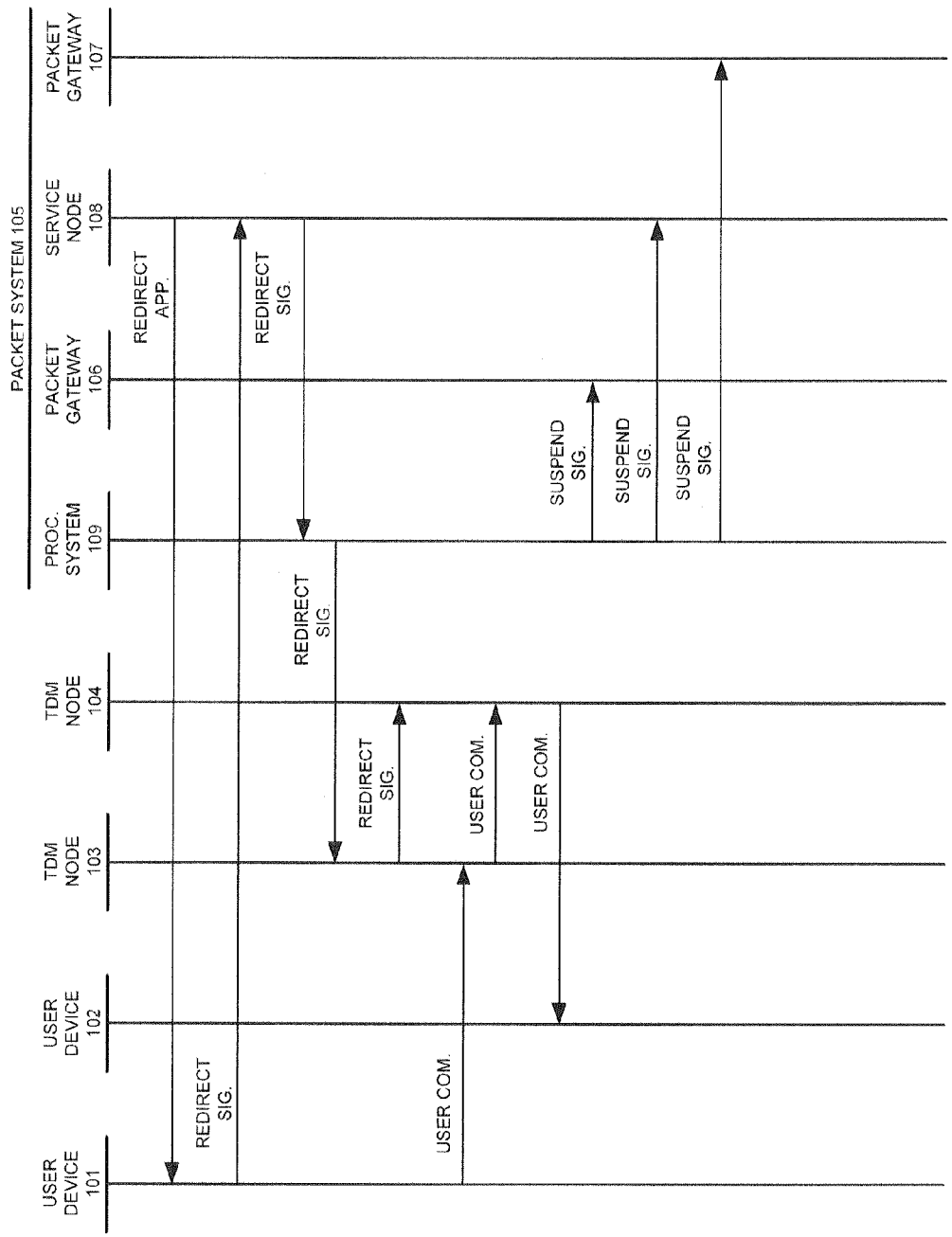
FIG. 6 illustrates the operation of the communication system in an embodiment of the invention to remove the packet system from the communication path during the communication session.

FIG. 6 illustrates the operation of communication system 100 in an embodiment of the invention to remove packet system 105 from the communication path during the communication session. FIG. 6 shows an alternative to the technique described above for FIG. 3. In this alternative technique, the user has the ability to initiate the removal during the session. The operation of FIG. 6 starts after the operations described above for FIG. 2. Thus, user communications for the session already flow from user device 101 to user device 102 over the communication path through TDM nodes 103-104 and packet system 105.

Once the session is established, service node 108 transfers a redirect application to user device 101 over connections 126, 123, and 121. The redirect application may include an icon that is displayed to the user and that may be invoked by the user to initiate redirect. The redirect application enables user device 101 to initiate the removal of packet system 105 from the communication path during the session. Thus, user device 101 controls if and when service node 108 is on the user communication path.

Either the user or user device 101 determines that redirection should occur. For example, the user may no longer want service node 108 on the communication path due to cost, quality, or security. In another example, user device 101 may detect poor quality attributable to packet system 105. There could be other factors that invoke redirection. In response to the determination, user device 101 transfers redirect signaling to service node 108. The redirect signaling may traverse connections 121, 123, and 126.

Service node 108 processes the redirect signaling from user device 101 to transfer redirect signaling to processing system 109. The redirect signaling indicates that packet system 105 should be removed from the communication path for the session. Processing system 109 processes the redirect signaling from service node 109 to transfer redirect signaling to TDM node 103. The redirect signaling indicates that TDM connections 123-124 should be removed from the communication path for the session and that TDM node 103 should redirect user communications to TDM node 104. The redirect signaling also sets TDM node 103 to handle potential reset signaling from user device 101. TDM node 103 processes the redirect signaling to select TDM connection 125. TDM node 103 transfers redirect signaling to TDM node 104 indicating that TDM connection 125 will be used for the session instead of TDM connection 124.

TDM node 103 receives user communications for the session from connection 121 and redirects the user communications to TDM node 104 over TDM connection 125. TDM node 104 receives the user communications from TDM connection 125 and redirects the user communications to connection 122. Thus, packet system 105 (including service node 108) has been removed from the user communication path during the session in response to signaling from user device 101.

Processing system 109 also processes the redirect signaling from service node 108 to transfer suspend signaling as follows. Processing system 109 transfers suspend signaling to packet gateway 106 suspending the session over TDM connection 123 and packet connection 126. Processing system 109 transfers suspend signaling to service node 108 suspending the session over packet connections 126-127. Processing system 109 transfers suspend signaling to packet gateway 107 suspending the session over packet connection 127 and TDM connection 124. Alternatively, processing system 109 may not transfer any suspend signaling and leave connections 123-124 and 126-127 available and unused, or processing system 109 may transfer terminate signaling to release connections 123-124 and 126-127 from the session.

Figure 7:
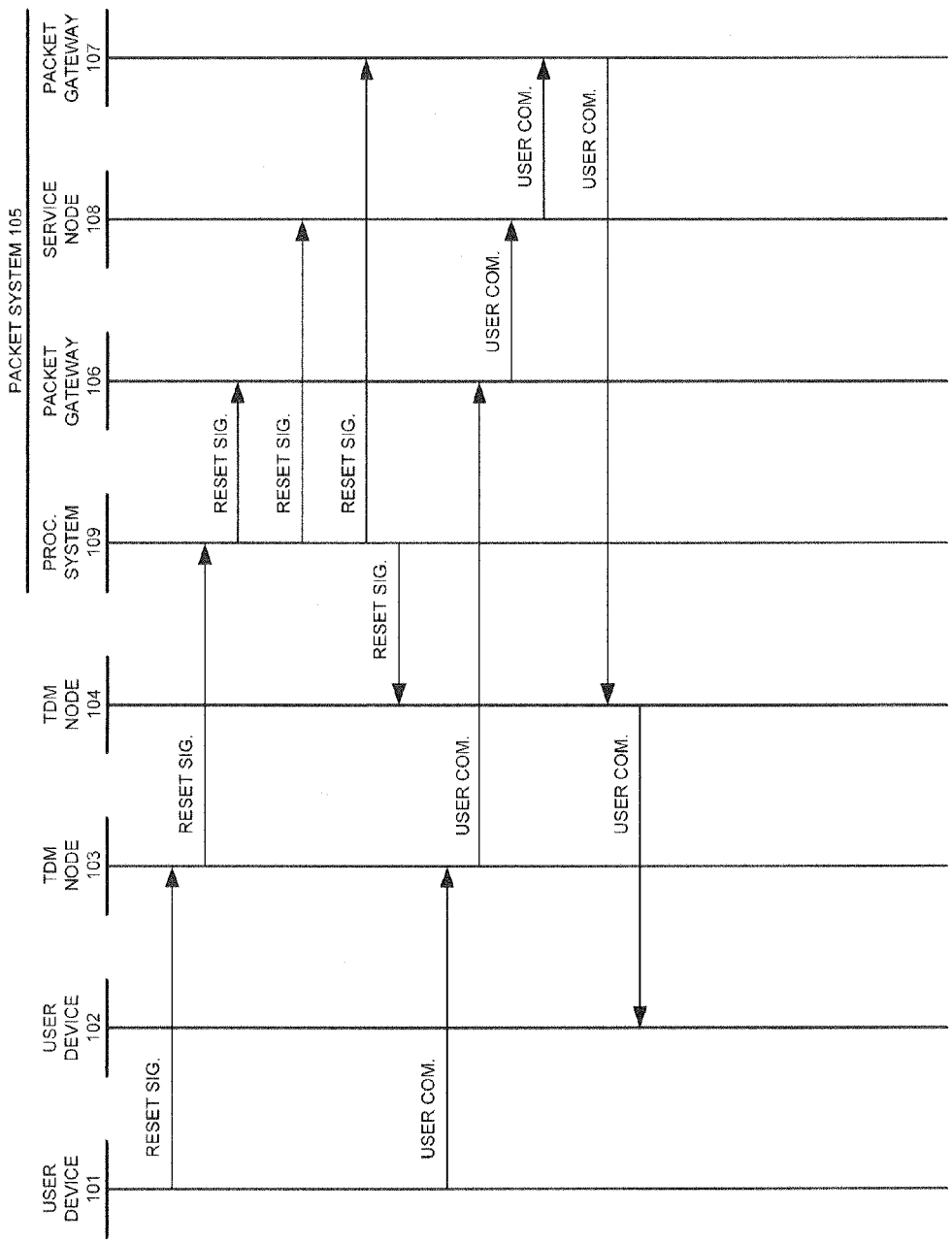
FIG. 7 illustrate the operation of the communication system in an embodiment of the invention to reset the communication path between the user systems through the TDM nodes and the packet system during the communication session.

FIG. 7 illustrate the operation of communication system 100 in an embodiment of the invention to reset the communication path between user systems 101-102 through TDM nodes 103-104 and packet system 105 during the communication session. The operation of FIG. 7 starts after the operations described above for FIG. 6. Thus, user communications for the session flow from user device 101 to user device 102 over the communication path through TDM nodes 103-104, but not through packet system 105.

Either the user or user device 101 determines that reset should occur for the communication session. For example, the user may want service node 108 back on the communication path during the session to obtain additional operator assistance, and accordingly, the user would invoke the icon displayed on user device 101. There could be other factors that invoke reset. In response to the determination, user device 101 transfers reset signaling to TDM node 103. The reset signaling may be tones or some other user input that traverses connection 121, or the reset signaling may be a reset message that traverses link 111. TDM node 103 processes the reset signaling to re-select TDM connection 123 to packet gateway 106, although a different TDM connection could be used if connection 123 were no longer available. TDM node 103 transfers reset signaling to processing system 109 indicating TDM connection 123 for the session.

Processing system 109 processes the reset signaling to select packet connections 126-127 and TDM connection 124, although different connections could be used if these connections were no longer available. Processing system 109 transfers reset signaling to packet gateway 106 indicating TDM connection 123 and packet connection 126. Processing system 109 transfers reset signaling to service node 108 indicating packet connections 126-127. Processing system 109 transfers reset signaling to packet gateway 107 indicating packet connection 127 and TDM connection 124. Processing system 109 transfers reset signaling to TDM node 104 indicating TDM connection 124.

TDM node 102 receives user communications from user device 101 over connection 121 and transfers the user communications to packet gateway 106 over TDM connection 123 instead of TDM connection 125. Packet gateway 106 transfers the user communications to service node 108 over packet connection 126. Service node 108 provides a service to the user communications and transfers the user communications to packet gateway 107 over packet connection 127. Packet gateway 107 transfers the user communications to TDM node 104 over TDM connection 124. TDM node 104 transfers the user communications to user device 102 over connection 122. Thus, packet system 105 (including service node 108) has been added back to the communication path during the session in response to signaling from user device 101.

Note that the redirect and reset signaling may use the same session identifier as the original set-up signaling. Thus, communication system 100 may associate information from the various stages of the communication session.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, the method comprising:
    in a first Time Division Multiplex (TDM) node, receiving first signaling for a communication session for a first user and transferring second signaling for the communication session to a packet system;
    in a second TDM node, receiving third signaling for the communication session from the packet system and transferring fourth signaling for the communication session for a second user;
    in the first TDM node, receiving first user communications for the communication session, and in response to the first signaling, transferring the first user communications to the packet system;
    in the second TDM node, receiving the first user communications from the packet system, and in response to the third signaling, transferring the first user communications for the second user;
    in the first TDM node, receiving fifth signaling for the communication session, and in response, transferring sixth signaling for the communication session to the second TDM node, receiving second user communications for the communication session, and transferring the second user communications to the second TDM node with the packet system removed from the signal path between the first TDM node and the second TDM node; and
    in the second TDM node, receiving the second user communications from the first TDM node, and in response to the sixth signaling, transferring the second user communications for the second user;
    in the first TDM node, receiving seventh signaling for the communication session and transferring eighth signaling for the communication session to the packet system;
    in the second TDM node, receiving ninth signaling for the communication session from the packet system;
    in the first TDM node, receiving third user communications for the communication session, and in response to the seventh signaling, transferring the third user communications to the packet system; and
    in the second TDM node, receiving the third user communications from the packet system, and in response to the ninth signaling, transferring the third user communications for the second user.

2. The method of claim 1 wherein the packet system comprises a service node that processes the first user communications to provide a service.

3. The method of claim 1 wherein receiving the fifth signaling in the first TDM node comprises receiving the fifth signaling from the packet system.

4. The method of claim 1 wherein the first user initiates the fifth signaling.

5. The method of claim 1 wherein the fifth signaling comprises Signaling System #7 signaling and the packet system comprises a voice over internet protocol network.

6. The method of claim 1 wherein the first user initiates the seventh signaling.

7. The method of claim 1 further comprising, in a processing system in the packet system, receiving the second signaling, transferring the third signaling, and transferring the fifth signaling.

8. The method of claim 7 further comprising:
receiving the first user communications from the first TDM node into a first packet gateway in the packet system and transferring the first user communications from the first packet gateway to a service node; and
transferring the first user communications from the service node to a second packet gateway in the packet system and transferring the first user communications from the second packet gateway to the second TDM node.

9. The method of claim 8 further comprising in the service node, providing a service to the first user communications and notifying the processing system when the service is complete, and wherein transferring the fifth signaling from the processing system comprises transferring the fifth signaling in response to receiving the notification from the service node.

10. A communication system comprising:
a first Time Division Multiplex (TDM) node configured to receive first signaling for a communication session for a first user, transfer second signaling for the communication session to a packet system, receive first user communications for the communication session, and in response to the first signaling, transfer the first user communications to the packet system; and
a second TDM node configured to receive third signaling for the communication session from the packet system and transfer fourth signaling for the communication session for a second user, receive the first user communications from the packet system, and in response to the third signaling, transfer the first user communications for the second user;
the first TDM node is further configured to receive fifth signaling for the communication session, and in response, transfer sixth signaling for the communication session to the second TDM node, receive second user communications for the communication session, and transfer the second user communications to the second TDM node with the packet system removed from the signal path between the first TDM node and the second TDM node; and
the second TDM node is further configured to receive the second user communications from the first TDM node, and in response to the sixth signaling, transfer the second user communications for the second user:
the first TDM node is further configured to receive seventh signaling for the communication session, transfer eighth signaling for the communication session to the packet system, receive third user communications for the communication session, and in response to the seventh signaling, transfer the third user communications to the packet system; and
the second TDM node is further configured to receive ninth signaling for the communication session from the packet system, receive the third user communications from the packet system, and in response to the ninth signaling, transfer the third user communications for the second user.

11. The communication system of claim 10 further comprising a service node in the packet system that processes the first user communications to provide a service.

12. The communication system of claim 10 wherein the first TDM node is further configured to receive the fifth signaling from the packet system.

13. The communication system of claim 10 wherein the first user initiates the fifth signaling.

14. The communication system of claim 10 wherein the fifth signaling comprises Signaling System #7 signaling and the packet system comprises a voice over internet protocol network.

15. The communication system of claim 10 wherein the first user initiates the seventh signaling.

16. The communication system of claim 10 further comprising a processing system in the packet system configured to receive the second signaling, transfer the third signaling, and transfer the fifth signaling.

17. The communication system of claim 16 further comprising:
a first packet gateway in the packet system configured to receive the first user communications from the first TDM node and transfer the first user communications to a service node; and
a second packet gateway in the packet system configured to receive the first user communications from the service node and transfer the first user communications to the second TDM node.

18. The communication system of claim 17 further comprising:
the service node configured to provide a service to the first user communications and notify the processing system when the service is complete; and
the processing system is further configured to transfer the fifth signaling in response to receiving the notification from the service node.

19. A method of operating a communication system, the method comprising:
in a first Time Division Multiplex (TDM) node, receiving first signaling for a communication session for a first user and transferring second signaling for the communication session to a packet system;
in a processing system in the packet system, receiving the second signaling and transferring third signaling;
in a second TDM node, receiving the third signaling for the communication session from the packet system and transferring fourth signaling for the communication session for a second user;
in the first TDM node, receiving first user communications for the communication session, and in response to the first signaling, transferring the first user communications to the packet system;
receiving the first user communications from the first TDM node into a first packet gateway in the packet system and transferring the first user communications from the first packet gateway to a service node;
transferring the first user communications from the service node to a second packet gateway in the packet system and transferring the first user communications from the second packet gateway to the second TDM node;
in the second TDM node, receiving the first user communications from the packet system, and in response to the third signaling, transferring the first user communications for the second user;
in the service node, providing a service to the first user communications and notifying the processing system when the service is complete;

in the processing system, transferring fifth signaling in response to receiving the notification from the service node;

in the first TDM node, receiving the fifth signaling for the communication session, and in response, transferring sixth signaling for the communication session to the second TDM node, receiving second user communications for the communication session, and transferring the second user communications to the second TDM node with the packet system removed from the signal path between the first TDM node and the second TDM node; and in the second TDM node, receiving the second user communications from the first TDM node, and in response to the sixth signaling, transferring the second user communications for the second user.

20. A communication system comprising:

a first Time Division Multiplex (TDM) node configured to receive first signaling for a communication session for a first user, transfer second signaling for the communication session to a packet system, receive first user communications for the communication session, and in response to the first signaling, transfer the first user communications to the packet system;

a processing system in the packet system configured to receive the second signaling and transfer third signaling;

a first packet gateway in the packet system configured to receive the first user communications from the first TDM node and transfer the first user communications to a service node;

a second packet gateway in the packet system configured to receive the first user communications from the service node and transfer the first user communications to a second TDM node;

the second TDM node configured to receive the third signaling for the communication session from the packet system and transfer fourth signaling for the communication session for a second user, receive the first user communications from the packet system, and in response to the third signaling, transfer the first user communications for the second user; and the service node configured to provide a service to the first user communications and notify the processing system when the service is complete;

the processing system further configured to transfer fifth signaling in response to receiving the notification from the service node;

the first TDM node is further configured to receive the fifth signaling for the communication session, and in response, transfer sixth signaling for the communication session to the second TDM node, receive second user communications for the communication session, and transfer the second user communications to the second TDM node with the packet system removed from the signal path between the first TDM node and the second TDM node; and the second TDM node is further configured to receive the second user communications from the first TDM node, and in response to the sixth signaling, transfer the second user communications for the second user.

* * * * *